(12) United States Patent
Mouton

(10) Patent No.: US 8,175,758 B2
(45) Date of Patent: May 8, 2012

(54) METHOD AND A DEVICE FOR CONTROLLING THE GROUND CLEARANCE OF AN AIRCRAFT

(75) Inventor: Luc Mouton, Eguilles (FR)

(73) Assignee: Eurocopter, Marignane Cedex (FR)

( * ) Notice: Subject to any disclaimer, the term of this patent is extended or adjusted under 35 U.S.C. 154(b) by 1121 days.

(21) Appl. No.: 12/030,219

(22) Filed: Feb. 13, 2008

(65) Prior Publication Data

US 2008/0201026 A1    Aug. 21, 2008

(30) Foreign Application Priority Data

Feb. 16, 2007    (FR) ...................... 07 01128

(51) Int. Cl.
*B64C 25/26* (2006.01)

(52) U.S. Cl. ...................... 701/3; 244/17.17; 244/102 R; 244/102 SS

(58) Field of Classification Search ................ 701/3, 15, 701/16; 244/17.17, 202, 101 R, 102 R, 102 SL, 244/102 SS
See application file for complete search history.

(56) References Cited

U.S. PATENT DOCUMENTS

| | | | |
|---|---|---|---|
| 2,973,955 A | 3/1961 | Brief | |
| 3,826,450 A * | 7/1974 | Currey et al. | 244/103 R |
| 3,887,174 A | 6/1975 | Whelan et al. | |
| 4,445,672 A | 5/1984 | Turiot | |
| 6,120,009 A | 9/2000 | Gatehouse et al. | |
| 6,575,405 B2 * | 6/2003 | Bryant et al. | 244/102 SL |
| 7,426,983 B2 * | 9/2008 | Ducos et al. | 188/297 |
| 2005/0011991 A1 * | 1/2005 | Ducos et al. | 244/102 R |
| 2006/0235582 A1 * | 10/2006 | Greene | 701/6 |
| 2009/0321560 A1 * | 12/2009 | Luce et al. | 244/102 R |

FOREIGN PATENT DOCUMENTS

| | | |
|---|---|---|
| EP | 0 677 679 A2 | 10/1995 |
| FR | 2 493 444 A1 | 5/1982 |
| GB | 821 874 A | 10/1959 |

* cited by examiner

*Primary Examiner* — Ruth Ilan
(74) *Attorney, Agent, or Firm* — Brooks Kushman P.C.

(57) ABSTRACT

The present invention relates to a method and to a device for controlling and adjusting the ground clearance ($\underline{h}$) of an aircraft (1) provided with at least one undercarriage (30), said undercarriage (30) being provided with a damper-actuator (2) for performing a damping function and a function of retracting said undercarriage (30). The method is remarkable in that control means (10) automatically activate adjustment means (11, 12) for adjusting the length of said damper-actuator (2) so as to maintain said ground clearance ($\underline{h}$) at a predetermined value.

13 Claims, 1 Drawing Sheet

METHOD AND A DEVICE FOR CONTROLLING THE GROUND CLEARANCE OF AN AIRCRAFT

The present invention relates to a method and a device for controlling the ground clearance of an aircraft, more particularly a rotorcraft, e.g. a helicopter having a rocker-beam undercarriage, for example.

BACKGROUND OF THE INVENTION

In order to satisfy determined requirements, it is sometimes necessary to lower and/or raise a rotorcraft having contact members resting on the ground, with these operations sometimes being referred to as "kneeling" and "erecting".

Lowering makes it possible in particular to load a helicopter in a small space such as the hold of a ship, or indeed a hangar of small dimensions.

Furthermore, in naval use, lowering increases the stability of a helicopter while it is standing on the deck of a ship, since lowering the helicopter lowers its center of gravity. In addition, when the ground clearance is small, where ground clearance is the height between the ground and the fuselage, it is easier to tie down the helicopter.

In contrast, raising the helicopter is an operation that can be useful, for example, in order to allow a vehicle to pass under the tail boom of the rotorcraft so as to penetrate into its hold.

In order to lower or raise an aircraft, devices are known that act on the undercarriages thereof, causing them to pass from a normal position to a low position or to a high position.

More precisely, document FR 2 608 242 discloses a damper-actuator that performs a function of damping an undercarriage and a function of retracting it, while also enabling it to be shortened or lengthened.

That damper-actuator is fitted to a rocker-beam undercarriage of a rotorcraft. Conventionally, it serves to extend or retract the undercarriage into a well provided for this purpose, while also performing a shock-absorbing function.

That damper-actuator includes a rod in which a first sliding piston defines an outlet chamber, which itself slides in a body by means of a second piston defining a retraction chamber. Thus, that device makes operations of lowering or raising possible by causing the undercarriage to go from a normal position to a lowered position or a raised position.

In order to lower a rotorcraft, an operator causes the outlet chamber to communicate with a hydraulic circuit while the pressure in the retraction chamber is low. The weight of the rotorcraft then causes the rod to penetrate into said body, so as to pass from a normal position to a lowered position. The rotorcraft is then in a lowered position.

In order to return to the normal position, it is necessary to put pressure back into the outlet chamber with the help of the hydraulic circuit. Similarly, in order to raise the rotorcraft, said pressure is raised even further so as to cause the rod to pass from a normal position to a raised position.

Consequently, such a device provided with at least one undercarriage including a damper-actuator can perform raising and lowering operations. Nevertheless, it is found that the device makes only three positions available, i.e. a lowered position, a normal position, and a raised position. Furthermore, each change requires action on the part of an operator.

In addition, ground clearance depends not only on the position adjustment, but also on the load of the aircraft, insofar as the damper-actuators of the undercarriages shorten to a greater or lesser extent depending on the total weight of the aircraft. If this weight is wrongly estimated that can lead to incidents insofar as the required ground clearance is not reached, e.g. because the wheels have been flattened excessively.

If the tires on the wheels are not inflated sufficiently, then ground clearance will be lower than expected, which can cause the equipment disposed under the fuselage of the aircraft, e.g. a radome, to be destroyed.

Similarly, outside temperature can have an influence on ground clearance.

OBJECTS AND SUMMARY OF THE INVENTION

An object of the present invention is to provide a method and a device that are active, making it possible to overcome the limitations of the above-mentioned devices and to guarantee that ground clearance is continuously adapted to the situation.

According to the invention, a method of controlling and adjusting the ground clearance of an aircraft provided with at least one undercarriage, the undercarriage being provided with a damper-actuator for performing a damping function and a function of retracting the undercarriage, is remarkable in that control means automatically activate adjustment means for adjusting the length of the damper-actuator so as to maintain the ground clearance at a predetermined value.

Advantageously, when the aircraft is on the ground, the adjustment means then continuously adjust the length of the damper-actuator.

Consequently, ground clearance is maintained at a predetermined value both automatically and continuously. Outside conditions or aircraft loading no longer have any influence since ground clearance is readjusted all the time.

This predetermined ground clearance value is specified to the control means, e.g. a microprocessor, via an interface. The interface, e.g. a keypad, may either be included in the control means, or it may be independent from the control means, being remote therefrom, e.g. in the cockpit of the aircraft.

Nevertheless, the control means advantageously includes safety features to prevent human error, for example.

For control means having a minimum safety value for the ground clearance, if said predetermined value is less than the minimum safety value, then the control means consider that said predetermined value is equal to the minimum safety value.

Similarly, for the control means including a maximum safety value for ground clearance, if said predetermined value is greater than said maximum safety value, then the control means consider that the predetermined value is equal to the maximum safety value.

These safety features then serve to put limits on the range available for the predetermined value.

Furthermore, in order to maintain ground clearance at the desired predetermined value, in an implementation of the method, a sensor sends a signal to the control means representative of the ground clearance of the aircraft. It can be seen below that the sensor may be a conventional laser sensor measuring a distance or else an angle sensor arranged on a lever arm of the undercarriage, for example.

The control means then activate the adjustment means so as to adjust the length of the damper-actuator so that the ground clearance reaches the predetermined value. The length of the damper-actuator is continuously increased or decreased so that the ground clearance remains at the set value.

In a variant of the invention, the device has a plurality of sensors, each sending a signal to the control means representative of a current value for ground clearance locally in a defined zone of the aircraft. The control means then process said signals, e.g. by averaging them, so as to determine an overall current value for ground clearance, and then activate the adjustment means so as to adjust the length of said damper-actuator so that the overall current value for ground clearance reaches the predetermined value.

The present invention also provides a device enabling the above-described method to be implemented.

A device for controlling and adjusting ground clearance of an aircraft provided with at least one undercarriage, the undercarriage being provided with a damper-actuator for performing a damper function and a function of retracting said undercarriage, is remarkable in that it is provided with means for adjusting the length of said damper-actuator and with control means, said control means automatically adjusting the length of the damper-actuator via said adjustment means so as to maintain the ground clearance at a predetermined value.

Preferably, the device includes an interface enabling an operator to specify the predetermined value as a function of circumstances in order to obtain ground clearance that is high or low.

It should be observed that the interface, e.g. a computer keypad or mouse, may be integrated in the control means or it may be remote therefrom.

When remote, the interface may be connected to the control means via a wire connection or a wireless connection, e.g. using a radio connection.

Furthermore, in order to measure the ground clearance of the aircraft, it is preferable for the device to include at least one sensor. The sensor may consist in a conventional laser sensor or indeed in an angle sensor for measuring the angle of inclination of the arm of the undercarriage, said angle of inclination determining ground clearance. Nevertheless, under such circumstances, the information delivered is somewhat degraded since the extent to which the tire is flattened against the ground as a function of the weight of the aircraft is not taken into account.

The sensor then sends a signal to the control means that is representative of the ground clearance. Thereafter, the control means compare the current value of the ground clearance as measured by the sensor with the predetermined set value that is to be reached.

If these values are different, then the control means activate the adjustment means in order to shorten or lengthen the damper-actuator of the undercarriage. Varying this length has a direct consequence on ground clearance.

For the damper-actuator provided with a rod in which a first sliding piston defines an outlet chamber, that itself slides in a body, the control means advantageously include at least one solenoid valve for varying the quantity of hydraulic liquid that is present in the outlet chamber of said damper-actuator.

When the solenoid valve enables said outlet chamber to be filled on instruction from the control means, the pressure in the chamber increases. Consequently, the length of the damper-actuator increases so that ground clearance reaches the desired value. It will be understood that this operation enables ground clearance to be increased.

Thus, the method and the device of the invention enable the ground clearance of an aircraft to be caused to vary throughout a range between a minimum value and a maximum value. In addition, the device operates in a closed loop, with ground clearance varying over time so as to be stabilized on the predetermined value set by an operator.

BRIEF DESCRIPTION OF THE DRAWING

The invention and its advantages appear in greater detail from the following description that illustrates preferred embodiments given without any limiting character and with reference to the accompanying drawing, in which.

Any element shown in more than one of the figures is given the same reference in each of them.

MORE DETAILED DESCRIPTION

Figure 1:
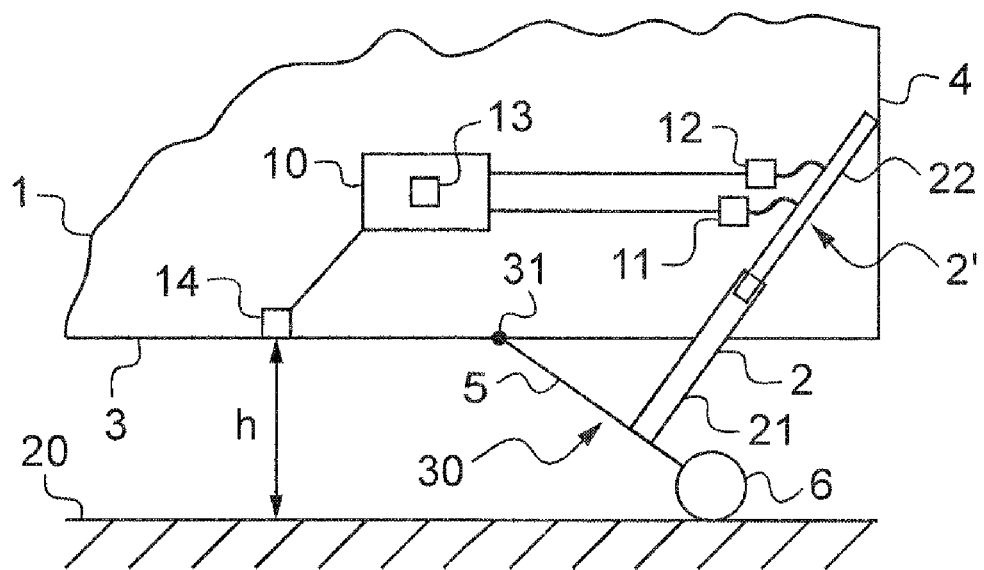
FIG. 1 is a diagrammatic view of a first embodiment of the device of the invention.
Figure 2:
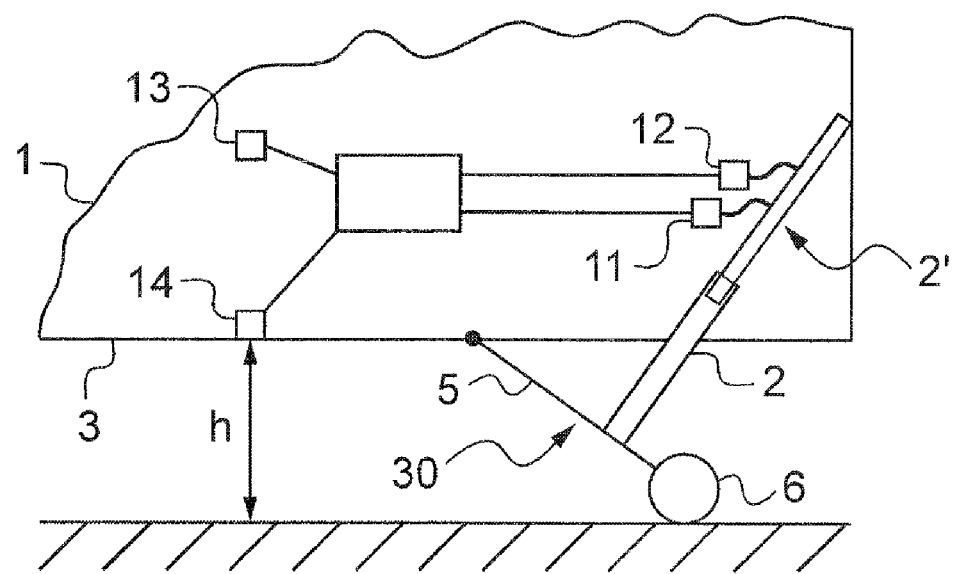
FIG. 2 is a diagrammatic view of a second embodiment of the device of the invention.

FIGS. 1 and 2 show an aircraft 1 having a floor 3 and a vertical structural element 4.

Furthermore, the aircraft 1 is standing on the ground 20 via at least one undercarriage 30 including an arm 5, a first end 31 of the arm 5 being hinged relative to the floor 3, while its second end is provided with running gear 6.

In this context, the height $\bar{h}$ between the floor 3 and the ground 20 is known as "ground clearance" by the person skilled in the art.

The undercarriage 30 is also provided with a conventional damper-actuator 2 that possesses a rod 21, and in which a first sliding piston defines an outlet chamber 2' that itself slides in a body 22. The damper-actuator 2 is secured firstly to the arm 5 of the undercarriage 30 and secondly to the structural element 4. The damper-actuator 2 thus serves firstly to retract and extend the undercarriage 30, and secondly to perform a damping function.

A particular object of the present invention is to provide a device for controlling and adjusting the ground clearance h of the aircraft 1 via control means 10, e.g. a microprocessor programmed for this purpose.

The control means then activate adjustment means 11, 12 for increasing or reducing the length of the damper-actuator 2. It will be understood that increasing the length of the damper-actuator produces a raising effect, i.e. increases the ground clearance $\bar{h}$, whereas reducing this length produces a lowering effect, i.e. reduces the ground clearance.

In accordance with the invention, the control means 10 adjust the length of the actuator automatically and continuously so that the ground clearance is maintained at a predetermined value.

To enable an operator to specify the predetermined value to the control means 10, the device has an interface 13, e.g. a keypad. Using this interface 13, the operators sets the predetermined value, i.e. the height that the ground clearance is to reach.

In a variant of the invention, the operator may optionally set a configuration, with the control means then deducing therefrom the setpoint for ground clearance. For example, the operator may inform the control means that the aircraft is fitted with a radome, from which the control means deduce a setpoint ground clearance to be reached suitable for ensuring that the radome is not damaged, with the deduction being performed by making use of a database, for example. The device then makes it possible to guarantee said ground clearance setting regardless of external conditions or the weight of the aircraft.

In a further variant, the control means include a minimum safety value. In this configuration, if the value specified by the operator via the interface is less than the safety value, then the predetermined value will be equal to the safety value. This makes it possible to ensure that minimum ground clearance is always provided so as to avoid damaging equipment.

Similarly, it is possible to envisage using a maximum safety value so as to avoid the damper-actuator 2 being put into abutment.

In a first embodiment, shown in FIG. 1, the interface is an integral portion of the control means. Under such circumstances, it may be merely a socket to which an operator connects a laptop computer, for example, in order to communicate with the control means 10.

In a second embodiment, shown in FIG. 2, the interface is remote. It does not form a part of the control means and it may be disposed in the cockpit of the aircraft, e.g. so as to be used by the pilot of the aircraft.

In a first variant of these embodiments, once the predetermined ground clearance value has been set, the control means activate the adjustment means to adjust the length of the damper-actuator.

Thereafter, the control means determine the length to be reached by the damper-actuator so as to obtain the desired ground clearance, and then control the adjustment means to increase or decrease said length appropriately.

This variant is effective, but it allows uncertainty to remain since the pressure of the tire(s) in the running gear 6 has a direct effect on the ground clearance h.

Thus, in a second variant of these embodiments, the device includes at least one sensor 14.

By way of example, the sensor is a laser sensor that provides a signal representative of the aircraft's ground clearance h. It is also possible to envisage an angle sensor located on the arm 5 of the undercarriage, but then the drawback associated with tire pressure remains.

If the ground clearance as measured is too small, then the control means 10 causes the length of the damper-actuator 2 to be increased. In contrast, if the ground clearance is found to be too great, then the control means 10 causes the length of the damper-actuator 2 to be decreased.

The device then operates in a closed-loop mode. It continuously and automatically adjusts the length of the damper-actuator so that the ground clearance tends towards the predetermined value set for the ground clearance.

In addition, in order to obtain good accuracy, it is possible to envisage using a plurality of sensors 14. The control means 10 then perform processing, e.g. averaging, in order to obtain a current value for the ground clearance h. This makes it possible to smooth the results so as to improve the accuracy of the device.

Finally, whatever the variant used, in order to adjust the length of the damper-actuator, the control means activate the adjustment means, constituted by solenoid valves 11, 12 that are connected to a hydraulic circuit (not shown) and that serve respectively to inject or remove hydraulic liquid from the outlet chamber 2' of the damper-actuator 2.

By allowing hydraulic fluid to be injected into the outlet chamber 2', the adjustment means increase the length of the damper-actuator 2, whereas this length decreases when liquid is removed therefrom. Reference can be made for example to document FR 2 608 242 to understand the operation of such a damper-actuator.

FIGS. 1 and 2 show a device having two adjustment means, i.e. two solenoid valves 11, 12. Nevertheless, it is possible to use single adjustment means capable either of delivering hydraulic liquid or gas into the outlet chamber, or else of removing it, depending on the instructions given by the control means 10.

Naturally, the present invention can be subjected to numerous variants in the way it is implemented. Although several embodiments are described above, it will readily be understood that it is not conceivable to identify exhaustively all possible embodiments. It is naturally possible to envisage replacing any of the means described by equivalent means, without thereby going beyond the ambit of the present invention.

Furthermore, although the description shows only one undercarriage, the method and the device are preferably adapted to controlling the length of each of the damper-actuators in a plurality of undercarriages. Thus, the device may comprise single control means 10 while nevertheless providing adjustment means for each damper-actuator of each undercarriage. The control means then control all of the adjustment means.

Such a device can also be used for adjusting the tilt of the aircraft, also referred to by the person skilled in the art as its "attitude". For example, if the ground is not flat, the control means activate the adjustment means to adjust the length of each damper-actuator, so that the length of one damper-actuator may be different from the length of another damper-actuator so as to keep the aircraft at a predetermined angle of inclination. Each damper-actuator then needs to comply with its own respective setpoint.

As an option, it is also possible to provide a plurality of sensors, namely one sensor measuring ground clearance and another sensor measuring the attitude of the aircraft.

Furthermore, it should be observed that the interface of the device optionally includes a screen enabling an operator to view the predetermined value and/or the ground clearance value in order to be able to check that the device is operating properly.

What is claimed is:

1. A method of controlling and adjusting the ground clearance (h) of an aircraft (1) provided with at least one undercarriage (30), said undercarriage (30) being provided with a damper-actuator (2) for performing a damping function and a function of retracting said undercarriage (30), wherein when the aircraft is on the ground, control means (10) automatically activate adjustment means (11, 12) for continuously adjusting the length of said damper-actuator (2) in order to maintain said ground clearance (h) at a predetermined value, said control means also setting limits on said predetermined value for the ground clearance (h), said predetermined value being specified to the control means (10) via an interface (13, 13').

2. A method according to claim 1, wherein for said control means (10) including a minimum safety value for ground clearance, if said predetermined value is less than said minimum safety value, then the control means (10) considers that said predetermined value is equal to said minimum safety value.

3. A method according to claim 1, wherein for said control means (10) including a maximum safety value for ground clearance, if said predetermined value is greater than said maximum safety value, then the control means (10) considers that said predetermined value is equal to said maximum safety value.

4. A method according to claim 1, wherein for a sensor (14) delivering a signal to the control means (10) representative of the current value of the ground clearance (h) of the aircraft (1), said control means (10) activate said adjustment means (11, 12) in order to adjust the length of said damper-actuator (2) so that said current value of the ground clearance (h) reaches said predetermined value.

5. A method according to claim 4, wherein said interface (13') is independent of said control means (10).

6. A method according to claim 1, wherein for a plurality of sensors (14) each sending a signal to the control means (10) representative of a local current value for the ground clearance (h) corresponding to a zone of the aircraft (1), said control means (10) perform processing on said signal to determine an overall current value for ground clearance and then activate said adjustment means (11, 12) to adjust the length of said damper-actuator (2) so that said overall current value of the ground clearance (h) reaches said predetermined value.

7. A device for controlling and adjusting the ground clearance (h) of an aircraft (1) provided with at least one undercarriage (30), said undercarriage (30) being provided with a damper-actuator (2) for performing a damping function and a function of retracting said undercarriage, the device being provided with adjustment means (11, 12) for adjusting the length of said damper-actuator (2) and with control means (10), said control means (10) continuously and automatically adjusting said length of said damper-actuator (2) via said adjustment means (11, 12) so as to maintain said ground clearance (h) at a predetermined value, said control means further applying limits to said predetermined value.

8. A device according to claim 7, including at least one sensor (14) for measuring said ground clearance (h).

9. A device according to claim 7, wherein said adjustment means (11, 12) comprises at least one solenoid valve for varying the quantity of a hydraulic liquid present in an outlet chamber (2') of said damper-actuator (2).

10. A device according to claim 7, wherein said control means (10) includes an interface (13) enabling an operator to specify said predetermined value.

11. A device according to claim 10, wherein said interface (13) is integrated in said control means (10).

12. A device according to claim 10, wherein for said interface (13) being remote, said interface (13) is connected to said control means (10) via a wired connection.

13. A device according to claim 10, wherein for said interface (13) being remote, said interface (13) is connected to said control means (10) via a wireless connection.

* * * * *